(12) United States Patent
Li et al.

(10) Patent No.: US 12,107,523 B2
(45) Date of Patent: Oct. 1, 2024

(54) METHOD FOR TRACING MTPA CURVE OF VEHICLE PERMANENT MAGNET SYNCHRONOUS MOTOR BASED ON DC POWER

(71) Applicant: Zhejiang University City College, Zhejiang (CN)

(72) Inventors: Jing Li, Hangzhou (CN); Feifan Ji, Hangzhou (CN); Yuwei Chen, Hangzhou (CN)

(73) Assignee: Zhejiang University City College, Hangzhou (CN)

( * ) Notice: Subject to any disclaimer, the term of this patent is extended or adjusted under 35 U.S.C. 154(b) by 184 days.

(21) Appl. No.: 17/840,597

(22) Filed: Jun. 14, 2022

(65) Prior Publication Data

US 2022/0329187 A1 Oct. 13, 2022

Related U.S. Application Data

(63) Continuation of application No. PCT/CN2022/070814, filed on Jan. 7, 2022.

(30) Foreign Application Priority Data

Mar. 22, 2021 (CN) .......................... 202110302222.9

(51) Int. Cl.
*H02P 21/22* (2016.01)
*H02P 21/20* (2016.01)
*H02P 25/022* (2016.01)

(52) U.S. Cl.
CPC .............. *H02P 21/22* (2016.02); *H02P 21/20* (2016.02); *H02P 25/022* (2013.01); *H02P 2207/05* (2013.01)

(58) Field of Classification Search
CPC ........ H02P 21/22; H02P 21/20; H02P 25/022; H02P 2207/00
See application file for complete search history.

(56) References Cited

U.S. PATENT DOCUMENTS

2006/0055363 A1* 3/2006 Patel ....................... H02P 21/10
318/757
2009/0284195 A1* 11/2009 Gallegos-Lopez ..... H02P 21/06
318/400.07

FOREIGN PATENT DOCUMENTS

CN 105262394 A 1/2016
CN 107592052 A 1/2018
(Continued)

OTHER PUBLICATIONS

First Office Action(JP2022-529425); Date of Mailing: Jul. 26, 2023.
(Continued)

*Primary Examiner* — Zoheb S Imtiaz
(74) *Attorney, Agent, or Firm* — W&G Law Group

(57) ABSTRACT

Disclosed is a method for searching a MTPA curve of a vehicle permanent magnet synchronous motor based on a DC power, which includes a current closed-loop adjuster, a current command generator, a current command angle generator, an active power calculator, an active power storage and comparison processor and a current given vector corrector. According to the present disclosure, the tedious manual calibration is relieved, the optimal angle is automatically searched, and the production efficiency is improved; according to the present disclosure, the step size can be arbitrarily set according to the calibration requirements, so as to achieve a higher calibration accuracy.

5 Claims, 4 Drawing Sheets

(56) References Cited

FOREIGN PATENT DOCUMENTS

| | | |
|---|---|---|
| CN | 110530083 A | 12/2019 |
| CN | 110581680 A | 12/2019 |
| CN | 111245321 A | 6/2020 |
| CN | 112468038 A | 3/2021 |
| CN | 112671301 A | 4/2021 |
| IN | 111082730 A | 4/2020 |
| JP | 2014507111 A | 3/2014 |
| KR | 20170060638 A | 6/2017 |

OTHER PUBLICATIONS

International Search Report (PCT/CN2022/070814); Date of Mailing: Mar. 30, 2022.
CN First Office Action(202110302222.9); Date of Mailing: Apr. 22, 2021.

* cited by examiner

METHOD FOR TRACING MTPA CURVE OF VEHICLE PERMANENT MAGNET SYNCHRONOUS MOTOR BASED ON DC POWER

CROSS-REFERENCE TO RELATED APPLICATIONS

The present application is a continuation of International Application No. PCT/CN2022/070814, filed on Jan. 7, 2022, which claims priority to Chinese Application No. 202110302222.9, filed on Mar. 22, 2021, the contents of both of which are incorporated herein by reference in their entireties.

TECHNICAL FIELD

The present disclosure belongs to the field of permanent magnet synchronous motor control, and in particular relates to a method for searching a MTPA curve of a vehicle permanent magnet synchronous motor based on a DC power.

BACKGROUND

In the control system of the interior permanent magnet synchronous motor (IPMSM) for vehicles, because there is an optimal relationship between the actual output of the motor and the vector angle of the current under the same current, the motor should run on the curve of the Maximum Torque Per Ampere (MTPA), that is, the angle value of the maximum output under the same current. At present, the mainstream method is manual calibration.

IPMSM has the characteristics of a high power density, a wide operating range and a high efficiency, so it is widely used as the driving motor of electric vehicles. The torque equation is:

$$T_e = 1.5 P_n (\varphi_f i_q + (L_d - L_q) i_d i_q) \quad (1)$$

where $T_e$ is the electromagnetic torque of a motor; $P_n$ is the number of pole pairs of the motor; $\varphi_f$ is the magnetic flux of a rotor permanent magnet; $i_q$ is the q-axis current, $i_d$ is the d-axis current; $L_d$ is the d-axis inductance; $L_q$ is the q-axis inductance; in the normal driving process of IPMSM, $T_e>0$, $i_q>0$, $i_d<0$, $L_d<L_q$.

It can be seen from the above formula that the torque is positively correlated with the current, but different combinations of d-axis and q-axis current will correspond to different torques, and each fixed current amplitude will have a set of specific dq current combinations to enable the motor to output the maximum torque at this current. Due to the saturation of a magnetic field, the inductance $L_d$ and $L_q$ of d-axis and q-axis will change with the change of current when the current is larger than a certain range, and the change range can be as much as 200%. The changes of these parameters make it very difficult or even infeasible to solve the optimal dq current combination at each current online. Therefore, in vehicle motor control, the optimal current combination corresponding to each torque is generally obtained through experimental tests and calibrations. The line connected by all such current combinations in the whole torque range is called the MTPA curve of the IPMSM.

In addition, the operation of IPMSM for vehicles depends on the inverter converting the DC bus of a power battery into three-phase AC, which means that the terminal voltage of motor is constrained by the DC bus; the voltage equation of the IPMSM is:

$$V_d = i_d R_s + L_d \frac{di_d}{dt} - \omega L_q i_q \quad (2)$$

$$V_q = i_q R_s + L_q \frac{di_q}{dt} + \omega(\varphi_f + L_d i_d)$$

where $V_d$ is the d-axis voltage of the motor and $V_q$ is the q-axis voltage of the motor; $R_s$ is the stator resistance and $\omega$ is the rotor electrical angular speed.

In a steady state with a high speed, the amplitude of the terminal voltage of the motor is approximately as follows:

$$|V_s| = \omega \sqrt{(L_q i_q)^2 + (\varphi_f + L_d i_d)^2} \quad (3)$$

When the motor speed increases, the terminal voltage of the motor increases, and when it exceeds the amplitude of the AC voltage provided by the bus voltage, it is necessary to carry out flux weakening control, and the maximum AC voltage that can be provided by the current bus is the voltage limit $V_{s\_lmt}$, with the general expression as follows $$V_{s\_lmt} = V_{dc} \cdot MI_{max} / \sqrt{3}$$

where $V_{dc}$ is the bus voltage, $MI_{max}$ is the maximum modulation index of the motor control system, the value of which is generally around 1, with a maximum of 1.1027.

In order to obtain the current combination which can satisfy the torque equation and the voltage limit, the dq current combination corresponding to each torque at different buses and rotating speeds is still calibrated by experimental means. Then these data are tabulated and stored in a digital control chip. When the motor is running in real time, the torque commands at different speeds and bus voltages are converted into corresponding dq current commands by looking up the table.

The premise that the above process can work normally is that the current combination obtained through the experimental calibration of the prototype can be applied to each motor of the same model; however, in practical applications, there are the following aspects that will make this assumption no longer valid:

1. When the motors are produced in batches, the process and materials will inevitably lead to the inconsistency of the motors.

2. When the rotation offset of the motor is deviated, even when the current regulator works normally, it will lead to the deviation of the magnetic field orientation on the control, and then the actual dq current in the motor is inconsistent with the expected current command.

3. The change of ambient temperature will affect the permanent magnet flux linkage; when the temperature decreases, $\varphi_f$ will increase, resulting in that the calibrated dq current command no longer meets the voltage limit.

Therefore, in order to enhance the robustness of the electric drive control system in the high-speed operation area, the flux weakening control link is generally added.

Patent document CN101855825B puts forward a representative solution to the problem of motor control flux weakening. As shown in FIG. 1, the voltage deviation is obtained according to the difference between the output voltage of the current regulator and the voltage limit, and a current correction $\Delta I_d$ obtained from this deviation through proportional link (PI) is superimposed on the d-axis current, and the upper limit of this correction is limited to 0, so as to deepen the flux weakening and achieve the purpose of flux weakening control. According to formula (3), when $(\varphi_f + L_d i_d) > 0$, increasing the $i_d$ in the negative direction can reduce the output voltage, that is, this solution is effective; however, when $(\varphi_f + L_d i_d) < 0$, if the $i_d$ continues to increase in the negative direction, the reverse increase of $V_q$ will lead to further increase of the output voltage, which will lead to more serious voltage saturation. Therefore, when using this method, $(\varphi_f + L_d i_d) > 0$ has to be ensured. However, in vehicle motor control, if this restriction is added, the reluctance torque of the motor in a high-speed area will not be fully utilized, and the performance of the motor will be sacrificed. Using the method of reducing $i_d$ in the above solution when the voltage is saturated can deepen the weak magnetic field and make the motor exit the voltage saturation state. However, this method has a great influence on the output torque, because only by correcting $i_d$, a large amount of $i_d$ correction is needed, and the dq current combination changes greatly, which even has a great influence on the output torque. Non-patent literature (T. M. Jahns, "Flux Weakening Regime Operation of an Interior Permanent-Magnet Synchronous Motor Drive", IEEE Trans. on Ind. Appl., vol. IA-23, no. 4, pp. 55-63, 1987) proposed a method to reduce $i_q$ in a weak magnetic region, but only adjusting a single current also faced the problem of great influence on the output torque. At present, no better existing technology has been found to be able to effectively deal with the voltage saturation problem while having little impact on the output torque as much as possible.

SUMMARY

In view of the shortcomings of the prior art, the purpose of the present disclosure is to provide a method for searching a MTPA curve of a vehicle permanent magnet synchronous motor based on a DC power.

The purpose of the present disclosure is realized through the following technical solution: a method for searching a MTPA curve of a vehicle permanent magnet synchronous motor based on a DC power, including a current closed-loop adjuster, a current command generator, a current command angle generator, an active power calculator, an active power storage and comparison processor and a current given vector corrector.

An input of the current closed-loop adjuster is a dq current command output by the current given vector corrector, and the dq voltage command is output after passing through a proportional-integral controller;

The current command generator is configured to gradually accumulate current amplitudes.

The current angle generation module is configured to gradually accumulate current angles.

The active power calculator is configured to calculate a real-time active power.

The active power storage and comparison processor is configured to store and compare the active power calculated by the active power calculator in a current step and a previous step in an angle accumulation process; if the active power increases after one step of current angle accumulation, the current angle accumulation is continued; if the active power does not increase after one step of current angle accumulation, the current angle accumulation is stopped, and a current amplitude, a current angle of the previous step and a corresponding active power are output.

The current given vector corrector calculates dq current commands according to the outputs of the current command generator and the current command angle generator.

Further, in the current closed-loop adjuster, the dq voltage command is obtained from the outputs of PI controllers, the inputs of the PI controllers are the deviation of the dq current command $i_{dref}$, $i_{qref}$ and the dq current feedback respectively.

Further, the current command generator takes a current amplitude I=0A as a starting point and $I_{step}$ as a step length to accumulate the current amplitude I.

Further, the current command angle generator takes 90° as a starting point and $\theta_{step}$ as a step length to accumulate the current angle θ.

Further, in the active power calculator, the real-time active power $P_{calcu}$ is:

$$P_{calcu} = u_d i_d + u_q i_q$$

where $i_d$ and $i_q$ are d-axis and q-axis components of a measured current; $u_d$ and $u_q$ are d-axis and q-axis components of the inner loop observation voltage.

Further, in the current given vector corrector, the dq current commands $i_{dref}$ and $i_{qref}$ are calculated as follows:

$$\begin{cases} i_{qref} = I(j)\cos(\theta(k)) \\ i_{dref} = -I(j)\sin(\theta(k)) \end{cases}$$

where I(j) is the current amplitude, and j is used to count the number of steps for current amplitude accumulation; θ(k) is the current angle, and k is used to count the number of steps of angle accumulation.

Further, the method includes the following specific steps:

(1) Starting from a current with an amplitude of 0A and an angle of 90°.

(2) Accumulating the current angle θ by the current command angle generator:

$$\theta(k) = \theta(k-1) + \theta_{step}$$

(3) Inputting, by the current command angle generator, the accumulated current angle into the current given vector corrector upon every step of current angle accumulation, and at the same time inputting, by the current command generator, the current amplitude into the current given vector corrector, and calculating, by the active power calculator, the active power $P_{calcu}(k)$ corresponding to one current step k.

(4) Repeating steps (2) to (3), accumulating current angles until the active power storage and comparison processor judge that the condition $P_{calcu}(k) - P_{calcu}(k-1) \leq 0$ is met, stopping current angle accumulation, and recording the current amplitude, the current angle θ(k−1) accumulated in the previous step and a corresponding active power $P_{calcu}(k-1)$ thereof as an available point.

(5) Accumulating, by the current command generator, the current amplitude I by taking the current amplitude as a starting point:

$$I(j) = I(j-1) + I_{step}$$

(6) Repeating steps (2) to (5) until the current amplitude accumulated in step (5) reaches the maximum required current of the proportional-integral controller, stopping circulation, and outputting the available point recorded in step (4) for the current amplitude by each current command generator.

The present disclosure has the following beneficial effects:

(1) According to the present disclosure, the tedious manual calibration is relived, the automatic search for the optimal angle is realized, and the production efficiency is improved;

(2) According to the present disclosure, the step length can be arbitrarily set according to the calibration requirements, and a higher calibration accuracy achieved.

DESCRIPTION OF EMBODIMENTS

Figure 1:
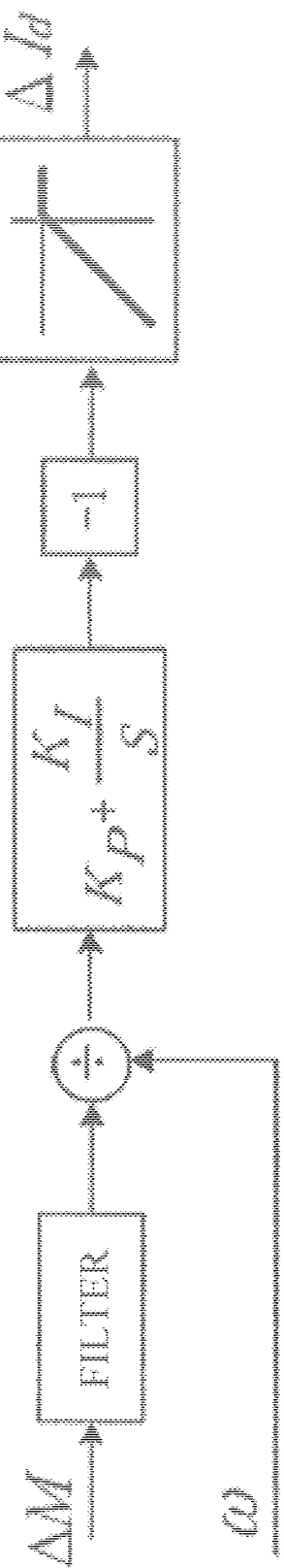
FIG. 1 is a topology block diagram of flux weakening control in the related art.
Figure 2:
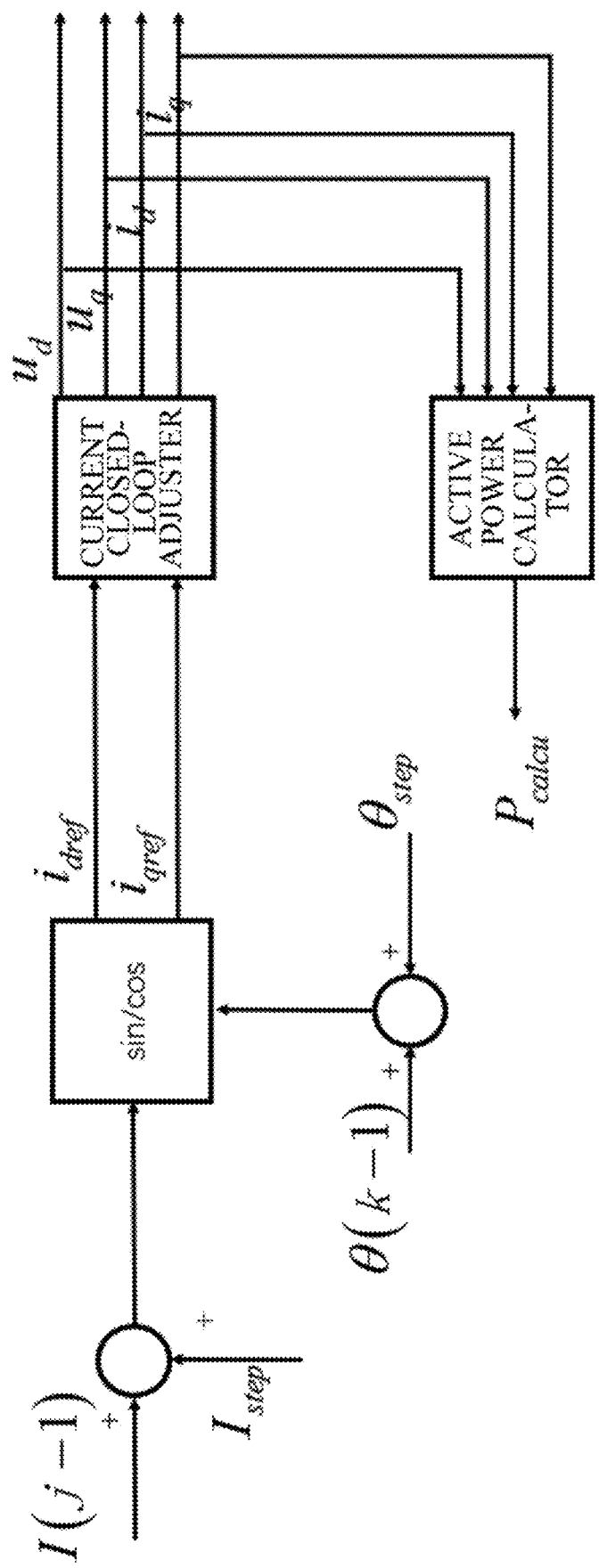
FIG. 2 is a schematic diagram of variable calculation according to the present disclosure.

The present disclosure relates to a method for searching a MTPA curve of a vehicle permanent magnet synchronous motor based on a DC power, which includes the following steps:

As shown in FIG. 2, the present disclosure includes the following modules:

1. A current closed-loop adjuster: this part is the dependent module of the present disclosure, and its function is to obtain the dq voltage commands from the outputs of PI controllers, the inputs of PI controllers are the deviation of dq current commands $i_{dref}$, $i_{qref}$ and the dq current feedback respectively.

2. A current command generator: starting from I(0)=0A and taking $I_{step}$ as a step length to progressively increase the current vector size I, where A is the current unit of ampere.

3. A current command angle generator: starting from θ(0)=90°, taking $θ_{step}$ as a step length to progressively increase the current angle θ.

4. An active power calculator: calculating the real-time active power $P_{calcu}$ during the operation of the motor:

$$P_{calcu}=u_d i_d + u_q i_q$$

where $i_d$ and $i_q$ are measured stator d-axis and q-axis current; $u_d$ and $u_q$ are d-axis and q-axis components of the inner loop observation voltage, which are equal to $v_{dqref}$ in value; $i_d$, $i_q$, $u_d$ and $u_q$ are all sampled values.

5. An active power storage and comparison processor: storing and comparing the active powers calculated by the active power calculator at the angles of the current step k and the previous step k−1; if $P_{calcu}(k)-P_{calcu}k-1)$ is positive, continuing searching; if the difference is 0 or negative, stopping searching and outputting the result of the previous step as an available result, including the current amplitude, the current angle of the previous step and a corresponding active power.

6. A current given vector corrector (sin/cos): calculating the current $i_{dref}$, $i_{qref}$ of the d-axis and q-axis after magnetic weakening as follows according to the outputs of the current command generator and current command angle generator:

$$\begin{cases} i_{qref} = I(j)\cos(\theta(k)) \\ i_{dref} = -I(j)\sin(\theta(k)) \end{cases}$$

where I(j) is the current amplitude and θ(k) is the current angle.

Figure 3:
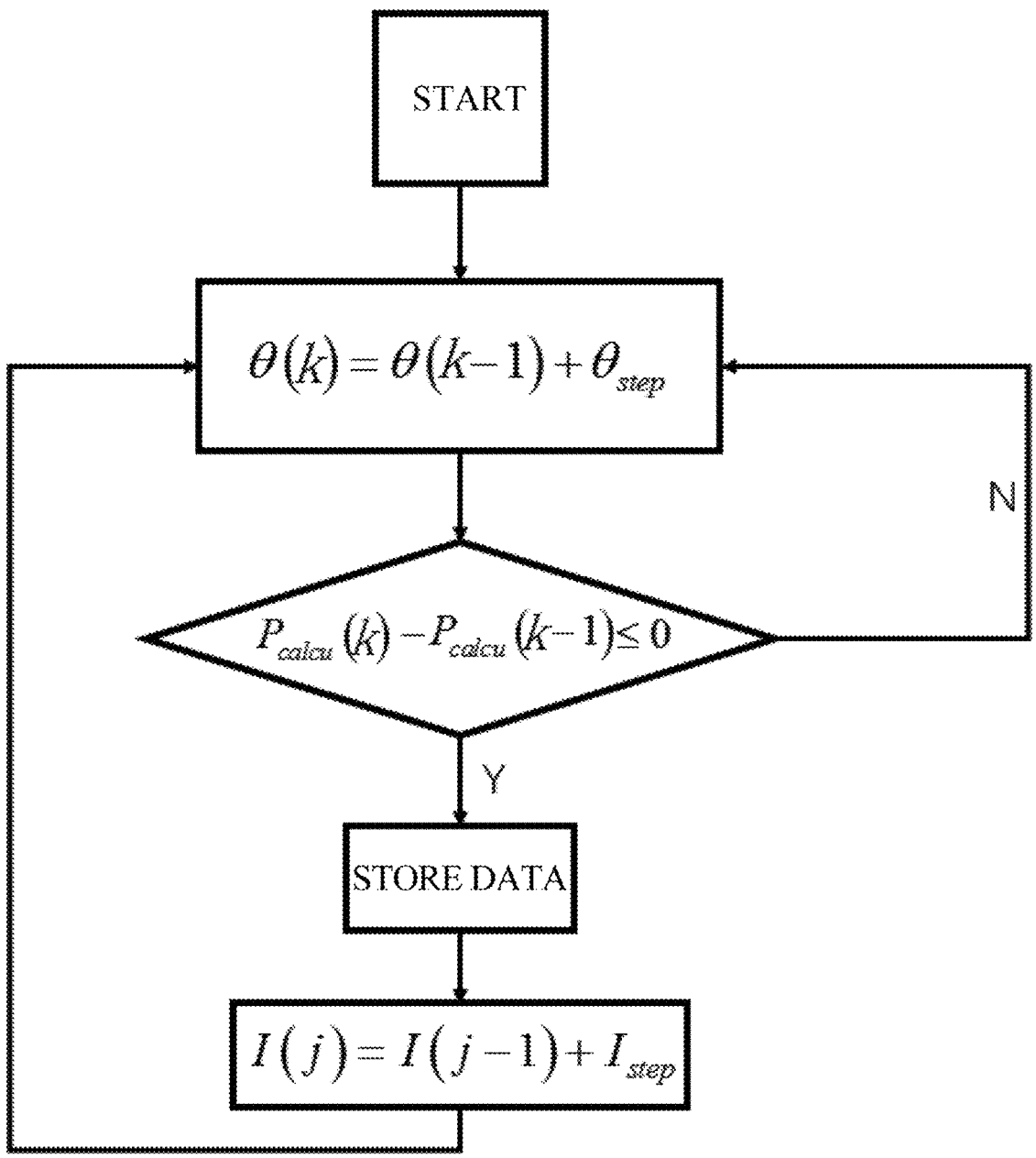
FIG. 3 is a logic main flow chart according to the present disclosure.

The workflow of that application is shown in FIG. 3, and includes:

(1) Starting from a current with a amplitude of 0A and an angle of 90°.

(2) Accumulating the current angle by the current command angle generator by taking θ step as a step length:

$$\theta(k)=\theta(k-1)+\theta_{step}$$

where k is used to count the steps for angle accumulation;

(3) inputting, by the current command angle generator, the accumulated current angle into the current given vector corrector upon every step of current angle accumulation, and at the same time inputting, by the current command generator, the current amplitude into the current given vector corrector, and calculating, by the active power calculator, the active power $P_{calcu}(k)$ corresponding to one current step k.

(4) Repeating steps (2) to (3), accumulating angles until the active power storage and comparison processor judges that the condition $P_{calcu}(k)-P_{calcu}(k-1) \leq 0$ is met, stopping current angle accumulation, and recording the current amplitude, the current angle θ(k−1) accumulated in the previous step and a corresponding active power $P_{calcu}(k-1)$ thereof as an available point, the current combination at this point corresponds to the maximum torque current.

(5) Accumulating, by the current command generator, the current amplitude I by taking $I_{step}$ as a step length:

$$I(j)=I(j-1)+I_{step}$$

where j is used to count the steps for current amplitude accumulation.

Figure 4:
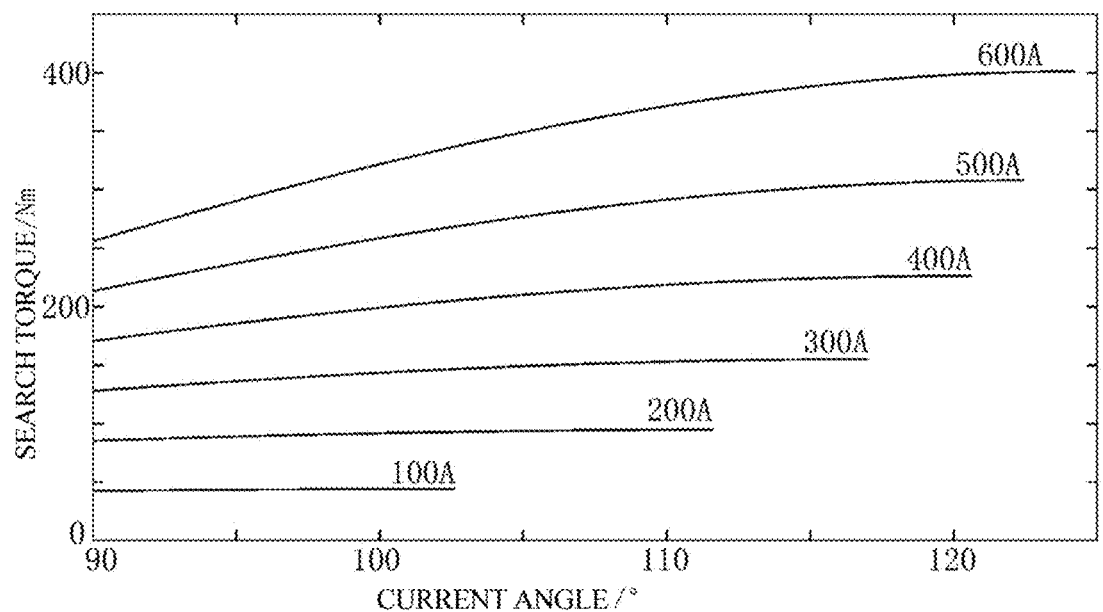
FIG. 4 is a schematic diagram of current angle search results.

(6) Repeating steps (2) to (5) until the current amplitude accumulated in step (5) reaches the maximum required current of the proportional-integral controller, stopping circulation, and outputting the available point recorded for each current amplitude by each current command generator. In this embodiment, the current angle search results with a step length $I_{step}$ of 100 A starting from 100 A to 600 A are shown in FIG. 4.

What is claimed is:

1. A method for tracing a MTPA curve of a vehicle permanent magnet synchronous motor based on a DC power, comprising a current closed-loop adjuster, a current command generator, a current command angle generator, an active power calculator, an active power storage and comparison processor and a current given vector corrector;

wherein an input of the current closed-loop adjuster is a dq current command output by the current given vector corrector, dq voltage command is generated after the dq current command passing through a proportional-integral controller, and the dq voltage command is output from the current closed-loop adjuster, wherein the dq voltage command comprises $u_d$ and $u_q$;

the current command generator is configured to gradually increase current amplitudes;

the current angle generator is configured to gradually increase current angles;

the active power calculator is configured to calculate a real-time active power;

the active power storage and comparison processor is configured to store and compare a current active power of a current step and a previous active power of a previous step during an angle increase process, wherein the current active power and the previous active power are calculated by the active power calculator; if the active power increases after one step of current angle increase, the current angle increase is continued; and if the active power does not increase after one step of current angle increase, the current angle increase is stopped, and a current amplitude, a current angle of the previous step and a corresponding active power are output;

according to the outputs of the current command generator and the current command angle generator, the current given vector corrector calculates dq current commands $i_{dref}$ and $i_{qref}$:

$$\begin{cases} i_{qref} = I(j)\cos(\theta(k)) \\ i_{dref} = -I(j)\sin(\theta(k)) \end{cases}$$

where $I(j)$ is the current amplitude, and j is for counting the number of steps for current amplitude increase; $\theta(k)$ is a current angle, and k is for counting the number of steps of angle increase;

the method comprises that following specific steps:

(1) starting from a current with a current of 0A and an angle of 90°;

(2) increasing the current angle $\theta$ by the current command angle generator:

$$\theta(k)=\theta(k-1)+\theta_{step}$$

(3) inputting, by the current command angle generator, the increased current angle into the current given vector corrector upon every step of current angle increase, and at the same time inputting, by the current command generator, the current amplitude into the current given vector corrector, and calculating, by the active power calculator, the active power $P_{calcu}(k)$ corresponding to one current step k based on the current angle under the current amplitude;

(4) repeating steps (2) to (3), increasing current angles until the active power storage and comparison processor judge that the condition $P_{calcu}(k)-P_{calcu}(k-1)\leq 0$ is met, stopping current angle increase, and recording the current amplitude, the current angle $\theta(k-1)$ increased in the previous step and a corresponding active power $P_{calcu}(k-1)$ thereof as an available point;

(5) increasing, by the current command generator, the current amplitude I by taking the current amplitude as a starting point:

$$I(j)=I(j-1)+I_{step}$$

(6) repeating steps (2) to (5) until the current amplitude increased in step (5) reaches a maximum required current of the proportional-integral controller, stopping circulation, and outputting the available point recorded in step (4) for the current amplitude by results of the current command generator for all iterations for the steps (1)-(6).

2. The method for tracing a MTPA curve of a vehicle permanent magnet synchronous motor based on a DC power according to claim 1, wherein in the current closed-loop adjuster, the dq voltage command is obtained from an output of PI controllers, and inputs of the PI controllers are a deviation of the dq current command $i_{dref}$ and a dq current feedback and a deviation of the dq current command $i_{qref}$ and a dq current feedback.

3. The method for tracing a MTPA curve of a vehicle permanent magnet synchronous motor based on a DC power according to claim 2, wherein the current command generator takes a current amplitude I=0A as a starting point and $I_{step}$ as a step length to increase the current amplitude I.

4. The method for tracing a MTPA curve of a vehicle permanent magnet synchronous motor based on a DC power according to claim 3, wherein the current command angle generator takes 90° as a starting point and $\theta_{step}$ as a step length to increase the current angle $\theta$.

5. The method for tracing a MTPA curve of a vehicle permanent magnet synchronous motor based on a DC power according to claim 4, wherein in the active power calculator, the real-time active power $P_{calcu}$ is:

$$P_{calcu}=u_d i_d + u_q i_q$$

where $i_d$ and $i_q$ are d-axis and q-axis components of a measured current, and represents the dq current feedback; $u_d$ and $u_q$ are d-axis and q-axis components of an inner loop observation voltage, wherein the inner loop observation voltage is the dq voltage command.

* * * * *